United States Patent
Li et al.

(10) Patent No.: US 7,027,514 B2
(45) Date of Patent: Apr. 11, 2006

(54) DISTRIBUTED VIDEO STREAM DECODING SYSTEM ON COMPUTER AND DECODING METHOD OF THE SAME

(75) Inventors: Chao-Cheng Li, Miao Li (TW);
Chin-Yuan Chiang, Taipei (TW);
Fu-Cheng Wu, Hsinchu (TW);
Yung-feng Chiu, Miao Li (TW)

(73) Assignee: Silicon Integrated Systems Corp., Hsin-chu (TW)

( * ) Notice: Subject to any disclaimer, the term of this patent is extended or adjusted under 35 U.S.C. 154(b) by 599 days.

(21) Appl. No.: 09/949,750

(22) Filed: Sep. 12, 2001

(65) Prior Publication Data

US 2003/0048848 A1 Mar. 13, 2003

(51) Int. Cl.
*H04N 7/12* (2006.01)

(52) U.S. Cl. ................................. 375/240.25

(58) Field of Classification Search ........... 375/240.02, 375/240.03, 240.12, 240.13, 240.18, 240.2, 375/240.22, 240.24, 240.25, 240.28; H04N 7/12
See application file for complete search history.

(56) References Cited

U.S. PATENT DOCUMENTS

| | | | | |
|---|---|---|---|---|
| 4,789,957 A | * | 12/1988 | Niehaus et al. ............. 708/518 |
| 5,414,468 A | * | 5/1995 | Lee ......................... 375/240.16 |
| 5,623,311 A | * | 4/1997 | Phillips et al. .......... 375/240.25 |
| 5,675,331 A | * | 10/1997 | Watanabe et al. .............. 341/67 |
| 5,812,791 A | * | 9/1998 | Wasserman et al. ......... 709/247 |
| 5,818,967 A | * | 10/1998 | Bhattacharjee et al. ..... 382/233 |
| 5,956,088 A | * | 9/1999 | Shen et al. ............. 375/240.25 |
| 5,990,958 A | | 11/1999 | Bheda et al. |
| 6,011,498 A | * | 1/2000 | Wittig .......................... 341/67 |
| 6,263,023 B1 | * | 7/2001 | Ngai ...................... 375/240.12 |
| 6,266,817 B1 | * | 7/2001 | Chaddha ..................... 725/146 |
| 6,393,152 B1 | * | 5/2002 | Takahashi et al. .......... 382/233 |
| 6,473,087 B1 | * | 10/2002 | Tsang .......................... 345/505 |
| 6,658,056 B1 | * | 12/2003 | Duruoz et al. .............. 375/240 |

\* cited by examiner

*Primary Examiner*—Nhon Diep
(74) *Attorney, Agent, or Firm*—Birch, Stewart, Kolasch & Birch, LLP

(57) ABSTRACT

A distributed video stream decoding system on computer and decoding method of the system is proposed to increase the decoding efficiency. The decoding method reads pictures of video stream and divides each picture into a plurality of slice packages through software modules executing on a CPU. Then, the method dispatches the slice packages by slice dispatcher and sends at least a slice into a master decoder when the slice queue of the master decoder less then a default value and sends a slice into a secondary decoder when the secondary decoder is waiting, respectively. Therefore, the master decoder and the secondary decoder can decode the received slice simultaneously to increase the decoding efficiency.

13 Claims, 5 Drawing Sheets

DISTRIBUTED VIDEO STREAM DECODING SYSTEM ON COMPUTER AND DECODING METHOD OF THE SAME

BACKGROUND OF THE INVENTION

1. Field of Invention

The present invention relates to a distributed video stream decoding system and, in particular, to a distributed video stream decoding system, which distributes the workload of a master decoder to a secondary decoder.

2. Related Art

FIG. 1 shows a structure of the motion picture experts group (MPEG) decoding system. After MPEG system data are sent into a system decoder 100, the data are divided into three groups of data, namely, a video stream, an audio stream, and timing information. The video stream will be transmitted to a video decoder 110 and be decompressed by the video decoder 110 into decompressed video data. The audio stream will be transmitted to an audio decoder 120 and be decompressed by the audio decoder 120 into decompressed audio data. The timing information is used to perform synchronization control over the video decoder 110 and the audio decoder 120.

FIG. 2 shows the structure of a video data steam. The video data steam consists of several picture groups and each picture group contains I, P, B, B, P, B, B pictures, where I is an intra-picture, P is an intra-frame predicted picture, and B is a bi-directional predicted picture. Each picture 130 contains many slices 140, and each slice 140 is composed of several macro-blocks 150. Moreover, each macro-block is formed by four blocks of 8*8 pixels. According to the MPEG specification, if the order of the I, P, and B pictures is I(1), B(2), B(3), P(4), B(5), B(6), and P(7), the order of the video data steam corresponding to the I, P, and B will be I(1), P(4), B(2), B(3), P(7), B(5), and B(6).

Thanks to the progress in high-speed operating CPU (Central Processing Unit), it is forecasted that the CPU operating speed will be over 1.5 GHz this year. Due to the limit on the decoding speed of the H/W (Hardware) MPEG, the idle time of the CPU will become longer if only the H/W MPEG is used to do the MPEG decoding work.

SUMMARY OF THE INVENTION

To solve the above problems, the invention provides a distributed video stream decoding system, which supports a main H/W decoder by running some decoding software in the CPU.

Another object of the invention is to provide a distributed video stream decoding system, which supports a main H/W decoder using a subsidiary H/W processor.

The disclosed distributed video stream decoding method uses a subsidiary decode to support the main decoder mainly comprised of hardware to speed up the whole decoding efficiency. The decoding method includes the steps of: reading a video stream image using software; dividing the image into a plurality of slice packages using software; parsing the slice packages into individual slices using software and transmitting one slice to the secondary decoder when the secondary decoder is idle and transmitting at least one slice to the main decoder when the slice queueing length in the main decoder is smaller than a predetermined threshold; and decoding the slice received by the secondary decoder and the slices received by the main decoder.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
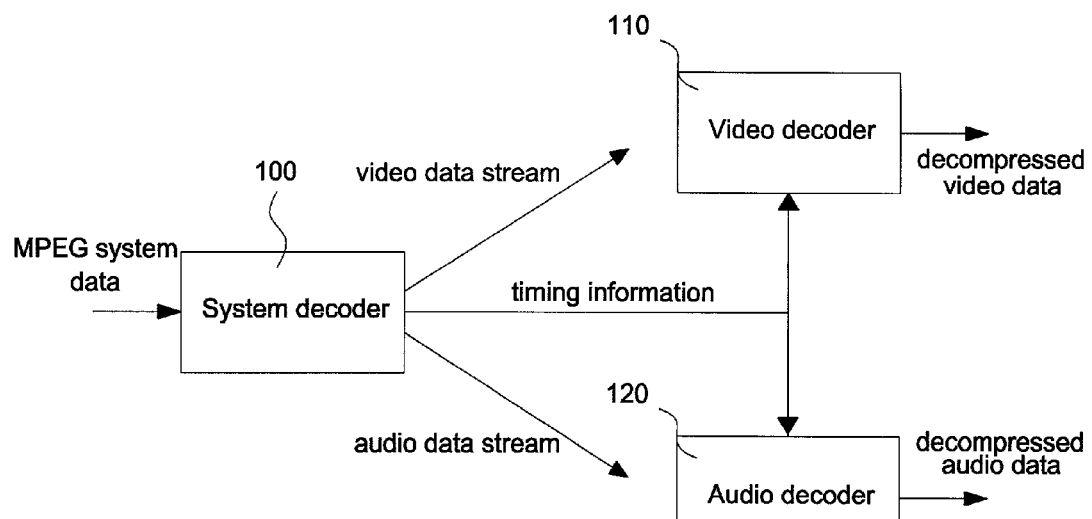
FIG. 1 illustrates a structure of the MPEG decoding system.
Figure 2:
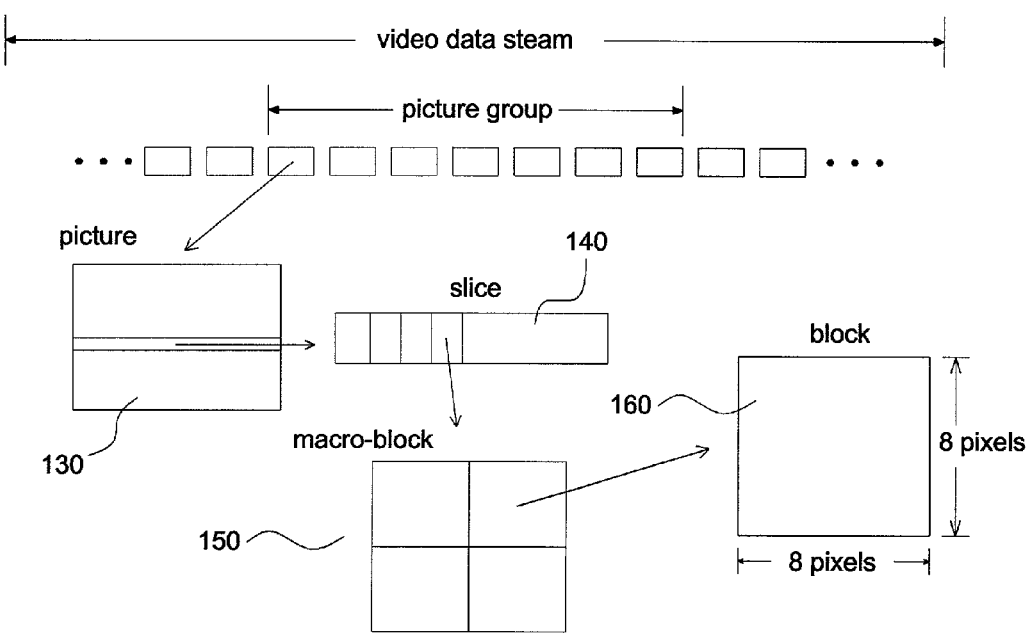
FIG. 2 illustrates a structure of the video data steam.
Figure 3:
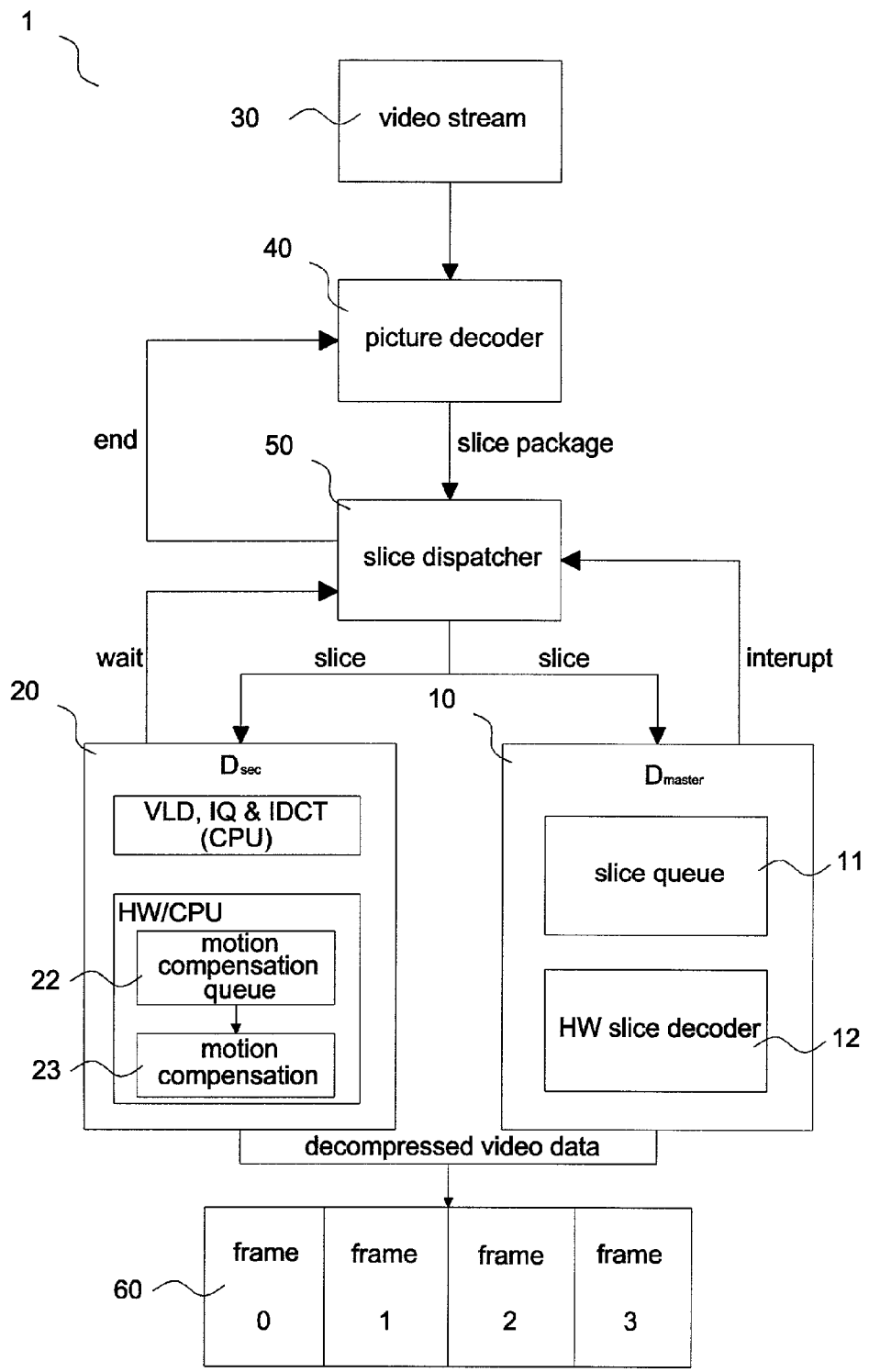
FIG. 3 illustrates a structure of the distributed video stream decoding system.

FIG. 3 shows a structure of distributed video stream decoding system. There are two slice decoders $D_{master}$ and $D_{sec}$ in the distributed video stream decoding system 1. $D_{master}$ is a master MPEG decoder 10, which is implemented by hardware. $D_{sec}$ is a secondary MPEG decoder 20, which can be implemented by software and/or simply hardware. After the stream decoding system 1 reads the video stream 30, the system generates slice packages by a picture decoder 40 and transmits the slice packages to a slice dispatcher 50. The slice dispatcher 50 separates a slice package into slices. Each slice is then sent to either the master MPEG decoder 10 or the secondary MPEG decoder 20 according to controls. The decompressed video data generated by the master MPEG decoder 10 and the secondary decoder 20 are saved to video frame memory 60. The reading of the video stream 30, the picture decoder 40 and the slice dispatcher 50 are controlled by computer software and processed by the CPU.

The slice dispatcher 50 transmits the slice into the slice queue 11 of the master MPEG decoder 10. Then the HW slice decoder 12 of the master MPEG decoder 10 decodes the slice stored in the slice queue 11 to generate decompressed video data. The secondary MPEG decoder 20 processes pre-decoding works by executing decoding software in the CPU, for example, parsing a compressed video stream by variable length decoding (VLD), executing inverse quantization (IQ) of decoded coefficients, executing inverse discrete cosine transform (IDCT), and saving the result to a motion compensation queue 22. Afterwards, either simple hardware 23 or software is used to execute motion compensation to generate decompressed video data. Then, the decompressed video data are saved to the video frame memory 60. The master MPEG decoder 10 is a conventional MPEG decoder and the decompressed video data are also saved to the video frame memory 60.

Since the master MPEG decoder 10 and the secondary MPEG decoder 20 process the decoding work for the slices in a parallel way (simultaneously), the advantage of the high-speed operating CPU can be used to support the work in the master MPEG decoder 10. Furthermore, the secondary decoder 20 can utilize the resources in the CPU or can be implemented by simple hardware. Therefore, the burden of the master MPEG decoder 10 can be reduced, boosting the whole decoding performance.

Figure 4:
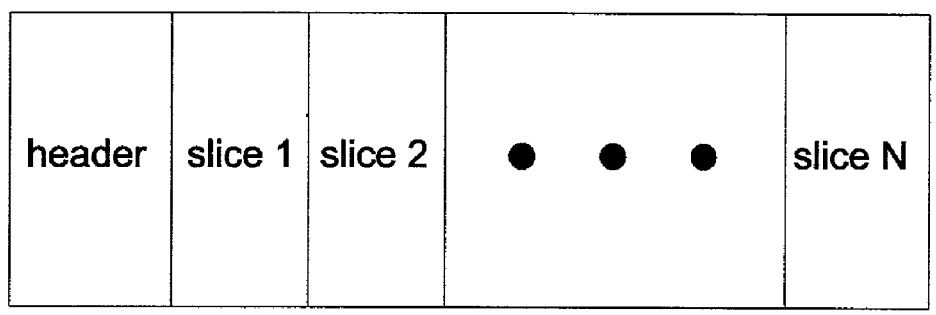
FIG. 4 illustrates a structure of a slice package.

FIG. 4 illustrates a structure of the slice package. As shown in the drawing, the slice package involves a picture header and several slices. Since the picture header has a larger data volume, there is a great difficulty in processing and more memory is occupied if the picture decoder 40 puts the picture header in each slice. Thus, the present invention attaches the picture header to each slice package in the picture decoder 40 and to each slice only in the slice dispatcher.

Figure 5:
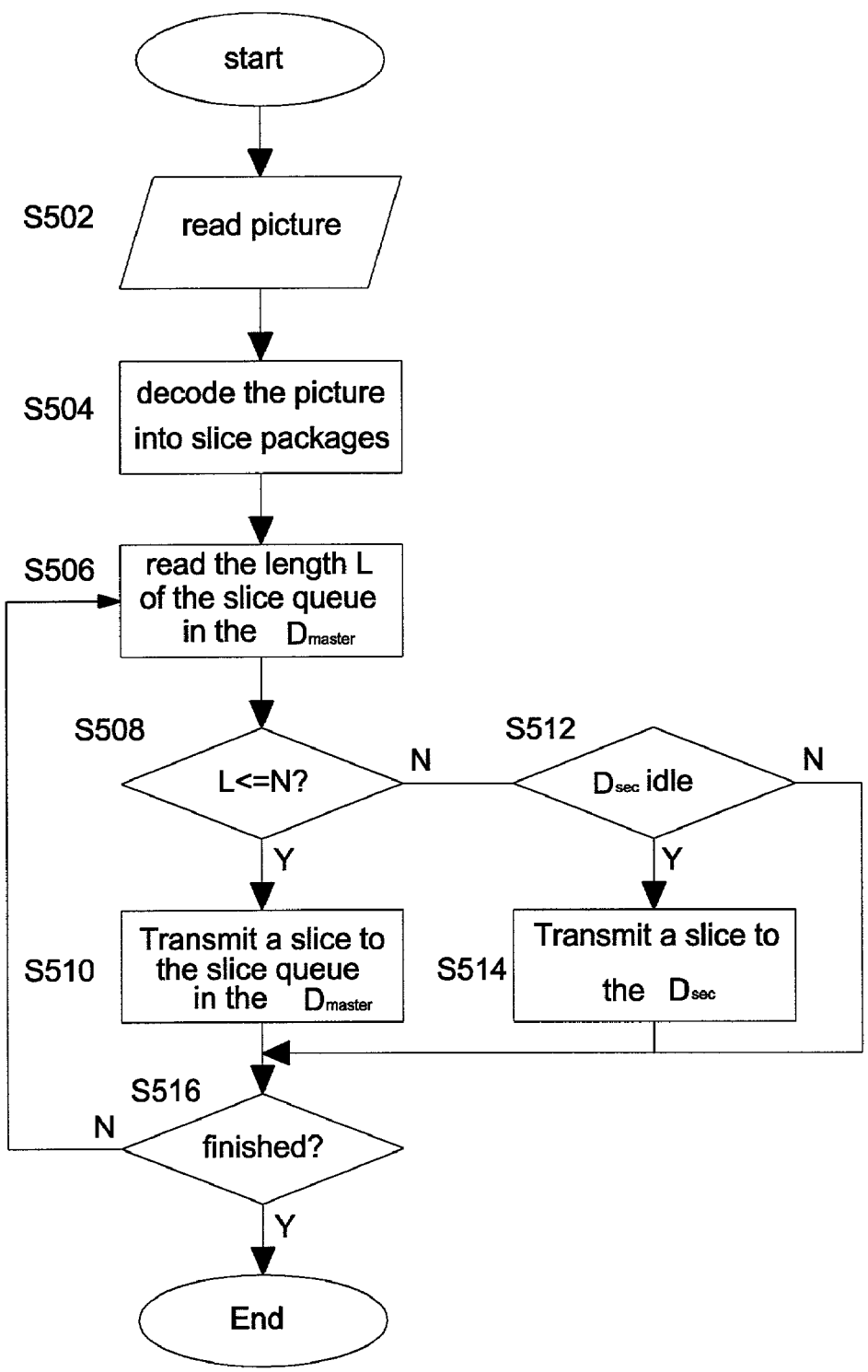
FIG. 5 is a control flowchart showing a first embodiment of slice distribution in the distributed video stream decoding system of the invention.

FIG. 5 is a control flowchart showing a first embodiment of slice allocation in the distributed video stream decoding system of the invention. As shown in the drawing, the steps of the slice allocation of the distributed video stream decoding system according to the invention are as follows:

Step S502: Read a coded picture from the computer.

Step S504: Decode the coded picture into slice packages.

Step S506: Read a buffering length L in the master MPEG decoder 10 from a DMA shadowed register.

Step S508: Compare to see if the buffering length L is smaller than a predetermined threshold N. If the buffering length L is smaller than the predetermined threshold N, step S510 follows; otherwise, step S512 is performed.

Step S510: Transmit a slice to the slice queue of the master MPEG decoder 10. The master MPEG decoder 10 decodes the slice package in the slice queue. Continue to step S516.

Step S512: Determine if the secondary MPEG decoder 20 is idle. If the secondary MPEG decoder 20 is idle, step S514 follows; otherwise, step S516 follows.

Step S514: Enter a slice to the secondary MPEG decoder 20. Continue to the step S516.

Step S516: Determine if the picture processing is finished. If not, continue to step S506; otherwise, the procedure is ended.

Figure 6:
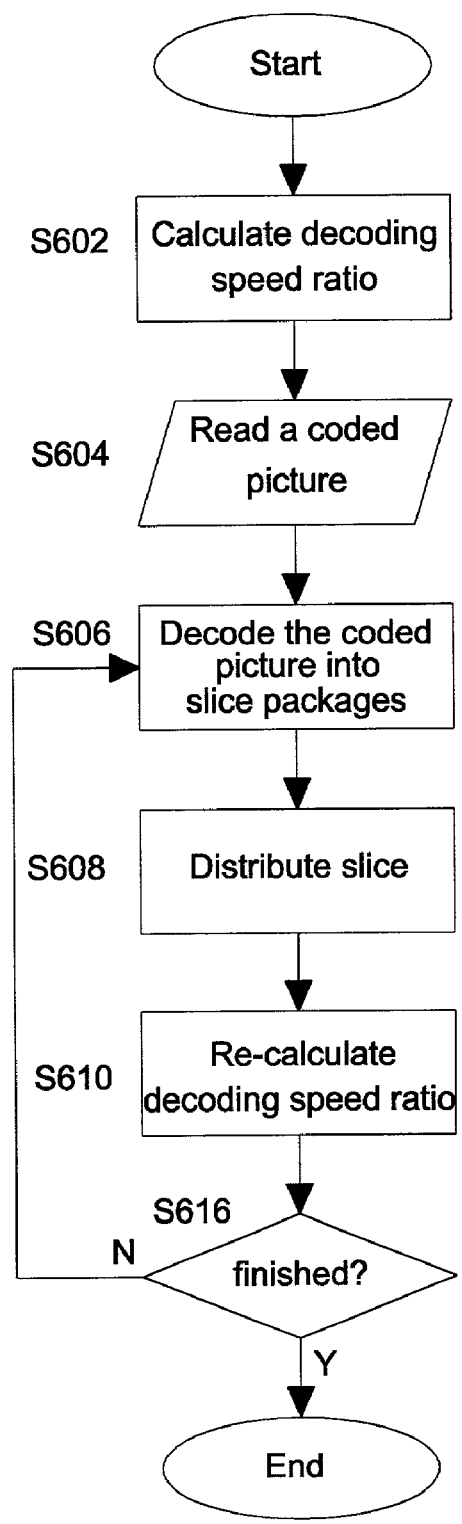
FIG. 6 is a control flowchart showing a second embodiment of slice distribution in the distributed video stream decoding system of the invention.

FIG. 6 is a control flowchart showing a second embodiment of slice allocation according to the distributed video stream decoding system of the invention. As shown in the drawing, the steps of the slice allocation by the distributed video stream decoding system according to the invention are as follows:

Step S602: Calculate respectively the decoding speed ratio between the master MPEG decoder 10 and the secondary MPEG decoder 20 on the pictures I, P, and B.

Step S604: Read a coded picture from the computer.

Step S606: Decode the coded picture into slice packages.

Step S608: Distribute the parsed slice data to the master MPEG decoder 10 and the secondary decoder 20 according to the decoding speed ratio between the master MPEG decoder 10 and the secondary MPEG decoder 20 on the pictures I, P, and B.

Step S610: Recalculate the decoding speed ratio between the master MPEG decoder 10 and the secondary MPEG decoder 20 on the pictures I, P, and B according to the change of the decoding speed of the secondary MPEG decoder 20 on the pictures I, P, and B.

Step S616: Determine if the picture processing is finished. If not, continue to step S606; otherwise, the procedure is ended.

There are two principal stages in the method of calculating the decoding speed ratio between the master MPEG decoder 10 and the secondary MPEG decoder 20. First, calculate respectively the time $T_{I1}$, $T_{I2}$, $T_{B1}$, $T_{B2}$, $T_{P1}$, and $T_{P2}$ that the master MPEG decoder 10 and the secondary MPEG decoder 20 spend to decode the prepared pictures I, P, and B. Secondly, calculate the decoding speed ratio between the master MPEG decoder 10 and the secondary MPEG decoder 20: $R_I = T_{I1}/(T_{I1}+T_{I2})$, $R_B = T_{B1}/(T_{B1}+T_{B2})$ and $R_P = T_{P1}/(T_{P1}+T_{P2})$. Thus, distributing different numbers of the slices to the master MPEG decoder 10 and the secondary decoder 20 is based on the decoding speed ratios $R_I$, $R_B$, and $R_P$. Since the host does not only do the decoding work but also runs other programs, therefore, it is necessary to recalculate the decoding speed ratio between the master MPEG decoder 10 and the secondary MPEG decoder 20 on the pictures I, P, and B to avoid bad job distributions. Dynamically adjusting the decoding speed ratio optimizes job distributions.

FIG. 5 and FIG. 6 are flowcharts showing that each picture slice is controlled and distributed by the software to either the master MPEG decoder 10 or the secondary MPEG decoder 20. At the same time of distribution, the master MPEG decoder 10 or the secondary MPEG decoder 20 is still decoding without break.

Certain variations would be apparent to those skilled in the art, which variations are considered within the spirit and scope of the claimed invention.

What is claimed is:

1. A distributed video stream decoding method, which uses a secondary decoder to support decoding in a master decoder implemented by hardware so as to speed up the decoding efficiency, the decoding method comprising the steps of:

calculating a decoding speed ratio between the secondary decoder and the master decoder on pictures I, P, and B;

adjusting the decoding speed ratio between the secondary decoder and the master decoder on pictures I, P, and B according to a decoding speed variation of the secondary decoder;

reading images of the video stream using software;

dividing the image into a plurality of slice packages using the software;

dispatching each of the slice packages into individual slices and distributing each of the slices to the master decoder or the secondary decoder according to the decoding speed ratio; and decoding the slices received by the secondary decoder and the master decoder.

2. The method of claim 1, wherein the decoding method of the secondary decoder is to execute decoding software by a CPU.

3. The method of claim 1, wherein the decoding method of the secondary decoder is to executing decoding software by a CPU in combination with simple hardware.

4. The method of claim 3, wherein the function of the decoding software for the secondary decoder includes parsing a compressed video stream by variable length decoding, executing inverse quantization of decoded coefficients, executing inverse discrete cosine transform, and saving the result to a motion compensation buffer.

5. The method of claim 4, wherein the simple hardware of the secondary decoder performs motion compensation.

6. A distributed video stream decoding method, which uses a secondary decoder to support decoding in a master decoder implemented by hardware so as to speed up the decoding efficiency, the decoding method comprising the steps of:

reading images of the video stream by software;

dividing the image into a plurality of slice packages by the software;

dispatching each of the slice package into individual slices, transmitting a slice to the secondary decoder when the secondary decoder is idle, and transmitting at least one slice to the master decoder when the slice queuing length in the master decoder is smaller than a predetermined threshold; and decoding the slices received by the secondary decoder and the master decoder.

7. The method of claim 6, wherein the decoding method of the secondary decoder is to execute decoding software by a CPU.

8. The method of claim 6, wherein the decoding method of the secondary decoder is to executing decoding software by a CPU in combination with simple hardware.

9. The method of claim 8, wherein the function of the decoding software for the secondary decoder includes parsing a compressed video stream by variable length decoding, executing inverse quantization of decoded coefficients, executing inverse discrete cosine transform, and saving the result to a motion compensation buffer.

10. The method of claim 9, wherein the simple hardware of the secondary decoder performs motion compensation.

11. A distributed video stream decoding system, which comprises:

a secondary decoder for executing decoding software to decode slices; and a master decoder implemented by hardware for decoding slices;

wherein the system distributes a slice to the secondary decoder when the secondary decoder is idle, and distributes at least one slice to the master decoder when a slice queuing length in the master decoder is smaller than a predetermined threshold.

12. The system of claim 11, wherein the workloads of the secondary decoder and the master decoder are determined and dynamically distributed according to a decoding speed ratio between the secondary decoder and the master decoder.

13. A distributed video stream decoding system, which comprises:

a secondary decoder for executing decoding software to decode slices; and a master decoder implemented by hardware for decoding slices;

wherein the workloads of the secondary decoder and the master decoder are determined by a decoding speed ratio between the secondary decoder and the master decoder on pictures I, P, and B and dynamically distributed according to a decoding speed variation of the secondary decoder.

* * * * *